United States Patent [19]

Busse et al.

[11] 4,265,749
[45] May 5, 1981

[54] CHAMBER FILTER PRESS

[75] Inventors: Oswald Busse; Hugo Klesper, both of Aarbergen, Fed. Rep. of Germany

[73] Assignee: Passavant-Werke Michelbacher Huette, Fed. Rep. of Germany

[21] Appl. No.: 88,017

[22] Filed: Oct. 25, 1979

[30] Foreign Application Priority Data

Nov. 20, 1978 [DE] Fed. Rep. of Germany ....... 2850223

[51] Int. Cl.³ .............................................. B01D 25/12
[52] U.S. Cl. ................................... 210/138; 210/230; 100/200
[58] Field of Search ............... 210/138, 225, 224, 230, 210/236; 100/46, 196, 197, 198, 199, 200, 193, 194, 195

[56] References Cited

U.S. PATENT DOCUMENTS

| 924,131 | 6/1909 | Behrend | 210/230 |
| 3,251,472 | 5/1966 | Kurita | 210/230 |
| 3,295,437 | 1/1967 | Fowler | 210/230 |
| 4,171,266 | 10/1979 | Kurita et al. | 210/230 |

FOREIGN PATENT DOCUMENTS 1919471 1/1970 Fed. Rep. of Germany .......... 210/230

Primary Examiner—Charles N. Hart
Assistant Examiner—David R. Sadowski
Attorney, Agent, or Firm—Woodford R. Thompson, Jr.

[57] ABSTRACT

A chamber filter press embodying movable filter plates suspended for movement along horizontal guides by an endless transporting assembly driven by a reversible motor and carrying dogging members which cooperate with cams on the filter plates as the press is opened. A switch connected to a time control device reverses the motor when the filter plate which has just been moved rests against the previously moved filter plate and at the end of a preset time the time control device switches the motor from reverse to forward motion. The motor is stopped by a limit switch which is operated by a dogging member at the end of a preset time after the last filter plate has been moved forward.

2 Claims, 3 Drawing Figures

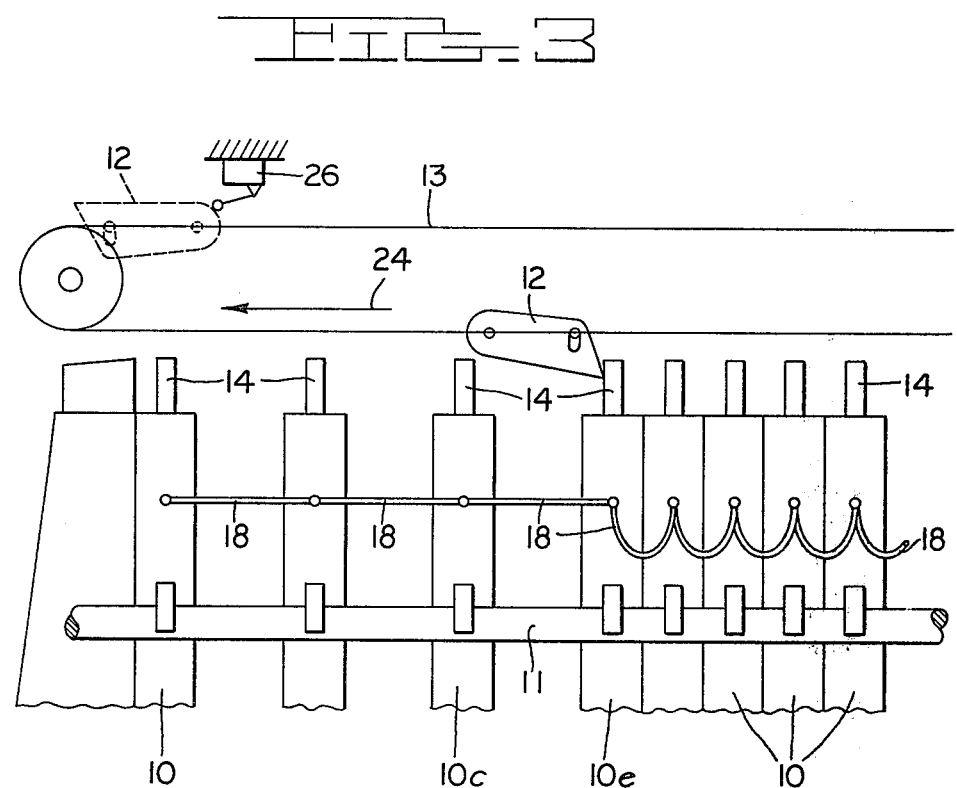

CHAMBER FILTER PRESS

BACKGROUND OF THE INVENTION

This invention relates to a chamber filter press and more particularly to such a press which has movable filter plates suspended on horizontal guides and moved thereon by an endless transporting assembly driven by a reversible motor. The transporting assembly carries dogging members which engage cams on the filter plates as the press is opened.

Difficulties have been encountered with prior art apparatus due to the fact that the dogging device must have a relatively complicated design which requires a second stop for the change-over from reverse to forward motion. This second stop must be so designed that at the end of the forward motion it automatically disengages from the plate just moved forward and then is immediately in the position again to seize the next filter plate at the end of the subsequent reverse motion.

SUMMARY OF THE INVENTION

In accordance with our present invention we simplify the change-over mechanism for a chamber filter press having movable filter plates suspended for movement along horizontal guides by an endless transporting assembly which is driven by a reversible motor and carries dogging members which move into engagement with cams on the filter plates as the press is opened. Our improved assembly is equipped with a switch which is actuated to change the direction of rotation of the motor from forward motion to reverse motion when the filter plate which has just been moved forward rests against a previously moved filter plate.

Upon actuation of the switch to change to reverse motion, the dogging device is brought to a standstill and thus the endless transporting device is stopped on reaching the end of its forward motion. The switching over from reverse motion to forward motion is achieved by conventional means, such as that disclosed in German Pat. No. 1,919,471. As soon as the dogging device has moved to a position behind the cam of the next filter plate to be moved forward, it engages with an additional stop on the front of this filter plate and thus stops the reverse motion of the transport device. This causes the switch to change over to forward motion, whereupon the filter plate, just seized moves forward and enables the filter cake on its reverse side to be discharged in the usual manner.

DESCRIPTION OF THE DRAWINGS

Apparatus embodying features of our invention is illustrated in the accompanying drawings, forming a part of this application, in which:

FIG. 3 is a schematic illustration showing the press in the rest position at the end of the opening operation.

DETAILED DESCRIPTION

Figure 1:
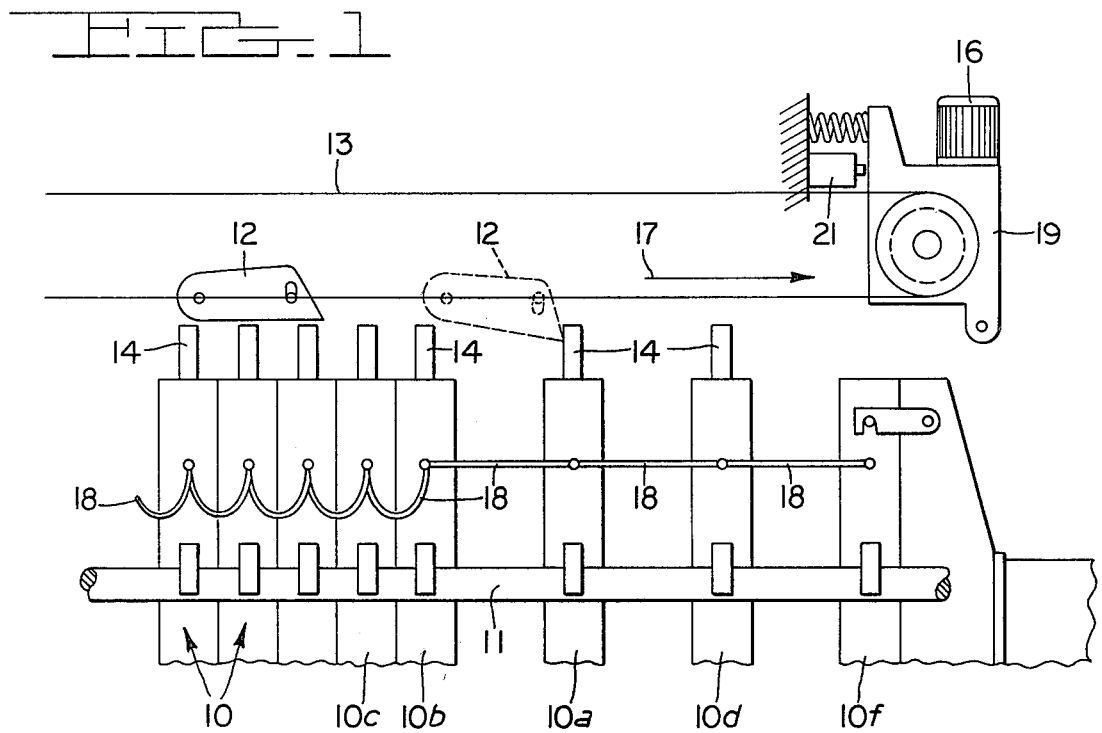
FIG. 1 is a schematic illustration of a chamber filter press in a first operating position.

From the foregoing and the description of the drawings hereinafter, it will be seen that an improved feature of our invention is that a switch is provided with a time control device which is actuated on switching over to reverse motion and which at the end of a preset time again switches over the motor from reverse to forward motion. The change-over from reverse to forward motion is thus effected by time responsive means rather than by distance responsive means and at the same time avoids costly control mechanism. The setting can be carried out in such a way that the dogging member is positioned behind and engages the cam of the next filter plate to be moved forward when the change-over to forward motion is made. Due to safety reasons it is also possible to extend the switching time so that the dogging device first moves back over several filter plates before the change-over to forward motion takes place. A conventional design for the dogging member having a deflecting surface ensures that the dogging member only engages in the gap behind the foremost filter plate.

The arrangement according to our invention is particularly suitable for such chamber filter presses in which the filter plates are interconnected by linking means, such as tension cable units, articulated levers or the like, whereby the extended position of the connecting means is just sufficient to discharge the filter cake. At the same time, several filter plates are always brought into the open position when the dogging member moves the foremost filter plate forward. At the next forward movement, the dogging member then engages with the cam of that filter plate which was previously brought into the open position last.

After the last filter plate has been moved forward, the opening procedure for the chamber filter press must be interrupted. While this can take place by manual means, automatic switching off is more advantageous. We accomplish this in accordance with our invention by providing a limit switch which stops the motor and is operated by the dogging member during reverse motion before the end of a preset time after the last filter plate has been moved forward. The limit switch is preferably a switch element which operates without contact.

Referring now to the drawings for a better understanding of our invention, the chamber filter press has a plurality of movable filter plates indicated generally at 10 which are suspended on horizontal guides 11. When the press is opened, the filter plates are moved forward in succession, namely by a dogging member 12 carried by an endless transport assembly 13 which engages an accompanying cam 14 of the filter plates. The endless transport assembly 13 is driven by a reversible motor 16.

FIG. 1 illustrates the commencement of forward motion of the transport assembly 13 whereby the dogging member 12 moves in the direction of the arrow 17. The dogging member has the usual deflecting surfaces and runs over the cams 14 of the filter plates which are still closed until the dogging member 12 reaches the dotted line position shown in FIG. 1 whereupon it engages with the filter plate $10^a$ opened last and brings this filter plate into the position illustrated in FIG. 2. At the same time, the plates $10^b$ and $10^c$ have also automatically opened as they are interconnected by a draw element 18, such as flexible tension cables, articulated levers or the like. In addition, the plate $10^d$ lying in front of plate $10^a$ is also moved along and rests against an end plate $10^f$.

Figure 2:
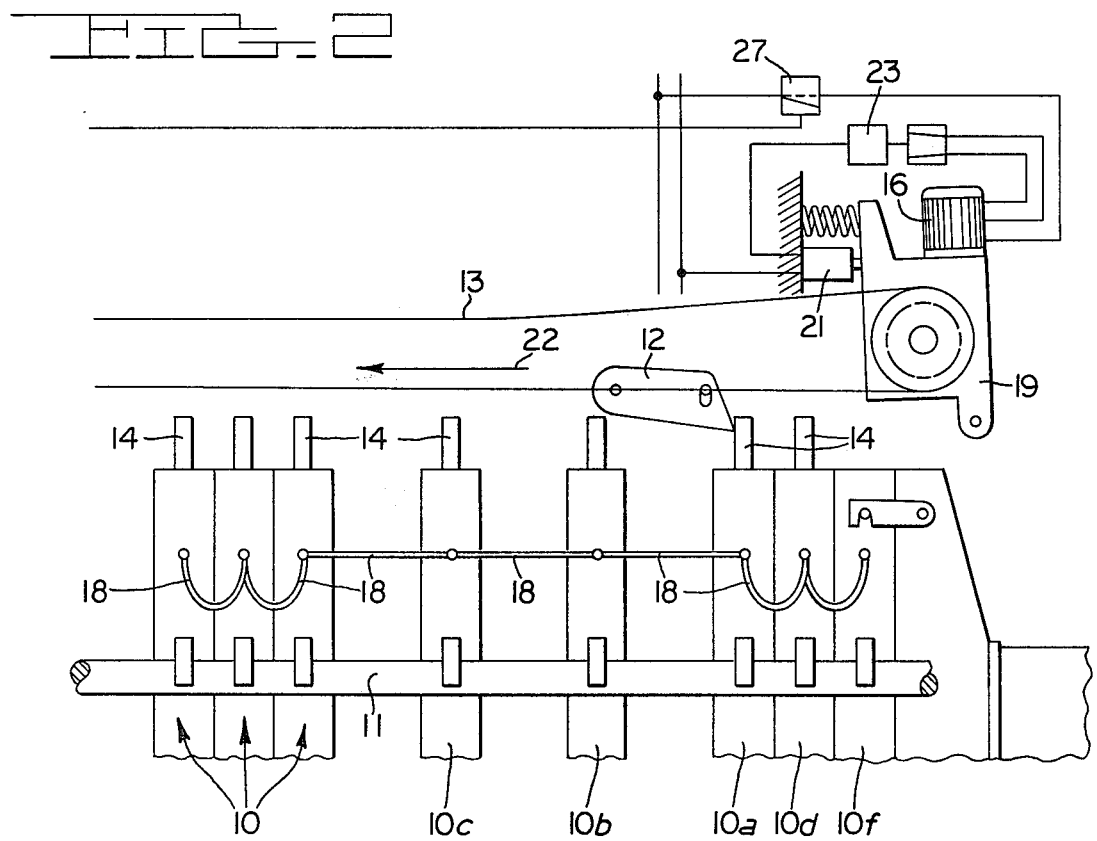
FIG. 2 is a schematic illustration corresponding to FIG. 1 showing the press in a subsequent operating position.

As soon as the plate $10^a$ rests against the plate $10^d$, moved previously forward and being supported by the end plate $10^f$, the transport assembly 13 is stopped. The reversible motor 16 is mounted on a rocking platform 19. Accordingly, as the motor continues to rotate, the rocking platform pivots from the position shown in FIG. 1 to the position shown in FIG. 2 and automatically operates a switch 21. This causes the motor 16 to rotate in a reverse direction whereupon the dogging member 12 begins to move in the direction of arrow 22, as shown in FIG. 2.

As the switch 21 is actuated a time control device 23 is activated. At the end of a preset time the dogging member 12 has again reached its position on the left, as viewed in FIG. 1, whereupon the time control mechanism 23 again switches the motor 16 over from reverse to forward motion.

FIG. 3 illustrates the end of the opening procedure of the chamber filter press. The dogging member 12 has moved the filter plate 10$^e$ forward and, after operating the switch 21 commences with its final reverse movement in the direction of the arrow 24. Immediately upon reaching its dotted line position in FIG. 3, it operates a limit switch 26. This takes place before the time period preset on the time control unit 23 has expired. The limit switch 26 acts on a relay 27, as shown in FIG. 2, which causes the motor 16 to stop.

While we have shown our invention in but one form, it will be obvious to those skilled in the art that it is not so limited, but is susceptible of various changes and modifications without departing from the spirit thereof.

What we claim is:

1. In a chamber filter press having a plurality of movable linked filter plates suspended for movement along horizontal guides, each said filter plate carrying a cam, means for separating a plurality of said filter plates with the opening of said filter press, with an endless filter plate transporting assembly, driven by a reversible motor and carrying dogging members which move over said cams on abutted filter plates in both directions with the exception of the cam on a foremost filter plate while the press is being opened, said dogging members engaging said cams of said filter plates separated by said linkage and having a switch means which reverses the direction of rotation of the motor from forward to reverse motion when the filter plate which has just been moved rests against the previously moved filter plate, connection means operatively connecting said switch means to a time control means which is energized in response to switching over to said reverse motion and at the end of a preset time said time control means switches said reversible motor again from reverse to forward motion.

2. A chamber filter press as defined in claim 1 in which said reversible motor is stopped by a limit switch which is actuated by said dogging member at the end of a preset time after the last filter plate has been moved forward.

* * * * *